United States Patent Office 3,720,639
Patented Mar. 13, 1973

3,720,639
FLUORINATED POLYOLS
James R. Griffith, Riverdale Heights, Md., assignor to the United States of America as represented by the Secretary of the Navy
No Drawing. Continuation-in-part of application Ser. No. 13,172, Feb. 20, 1970. This application June 24, 1971, Ser. No. 156,492
Int. Cl. C08g 51/34
U.S. Cl. 260—33.4 EP          15 Claims

ABSTRACT OF THE DISCLOSURE

A fluorinated polyol is formed from the polymerization reaction of a diglycidyl ether with a fluorinated dihydroxy hydrocarbon. The polymerization may be carried out with a tertiary amine catalyst and with or without a polar solvent. The reaction may take place in-situ as a coating on a surface, or as an adhesive between laminates, or as a molding material within a mold. The product is useful in applications requiring the hydrophobic properties of fluorine in combination with the adhesive and molding properties of epoxy resins.

CROSS-REFERENCE TO RELATED APPLICATIONS

This application is a continuation-in-part of application Ser. No. 13,172 filed Feb. 20, 1970, now abandoned.

BACKGROUND OF THE INVENTION

This invention pertains to the inclusion of fluorine into organic polymers. More particularly it relates to the incorporation of sufficient amounts of fluorine into the structures of epoxy resins and curing agents to realize fluorocarbon properties without detracting from beneficial epoxy properties.

It is especially desirable to include long fluorinated chains in the epoxy systems because they are apparently able to concentrate in a free surface during the cure reaction and impart low friction, oleophobic, and hydrophobic properties to the cast resin surface. In U.S. application S.N. 10,942 filed February 12, 1970 such chains were attached to the curing agent. In this invention the fluorinated carbon chains are attached to polyfunctional epoxy resins via reaction with fluorinated alcohols.

SUMMARY OF THE INVENTION

This invention provides a fluorinated polyol and a curable mixture and method for the preparation thereof not previously known. It particularly provides for the attachment of fluorinated carbon chains to epoxy resins by the curing of a mixture comprising a polyglycidyl polyether and a fluorinated dihydroxy hydrocarbon. The presence of a catalyst and/or solvent is desirable but not necesary to cure the reactants. An advantage of the present invention is that it is adaptable to in-situ application whereby the reactants may be cast into a mold or applied to a desired surface and polymerized in place. The curable compositions can be spread, brushed or sprayed by techniques known in the paint, varnish and lacquer industries, and can also be used in the encapsulation of electrical components. Other advantageous techniques applicable to this invention are to utilize a solvent as a diluent, either before or after polymerization, and then apply the solution to a surface in the aforementioned manner.

STATEMENT OF THE OBJECTS OF THE INVENTION

It is an object of the present invention to provide a novel and useful class of fluorinated polyols.

It is a further object to provide a class of fluorinated polyols which combine the desirable properties of epoxy resins with those of fluorocarbons.

It is an additional object to provide a class of fluorinated polyols which have hydrophobic, oleophobic, and low friction surface characteristics.

Another object is to provide curable mixtures of a polyglycidyl polyether and a fluorinated dihydroxy hydrocarbon.

It is another object to provide various methods for the preparation, use, and curing of the fluorinated polyols.

Additional objects will be apparent to one skilled in the art and still other objects will become apparent hereafter.

DESCRIPTION OF THE PREFERRED EMBODIMENTS

It has been found that the foregoing and additional objects are accomplished by first reacting a dihydric phenol with a halohydrin, such as monohalohydrins, epihalohydrins and the like. The intermediate polyglycidyl polyether thus formed is subsequently cured with a fluorinated dihydroxy hydrocarbon to form the fluorinated polyol product. The general reaction is

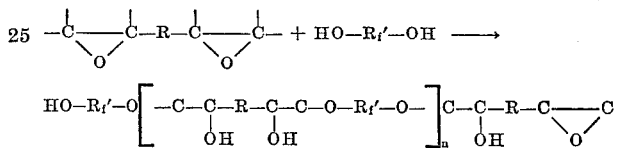

where $n$ is an integer of the series 0, 1, 2, 3 ..., R represents the divalent hydrocarbon radical of the dihydric phenol which may or may not be fluorinated, and $R_f'$ represents a divalent fluoro-aromatic or fluoro-aliphatic carbon radical. The value of $n$ is commonly determined by molecular weight measurement which, in turn, is computed as an average number. As will be shown later, this number is dependent on a number of factors such as reaction time and temperature, whether or not a solvent and/or catalyst is used, the proportions of reactants used and the time of impurities present. Generally the reaction can be carired out with about one to two molar parts of polyglycidyl polyether to about one to two molar parts of fluorinated dihydroxy hydrocarbon.

The type of polyglycidyl polyethers employed in this invention are prepared from the reaction of epichlorohydrin and polyhydric phenols in an alkaline medium. An advantageous method for such a preparation is to heat a dihydric phenol with epichlorohydrin in the presence of sufficient caustic alkali, or other strong aqueous alkali, e.g. potassium hydroxide, to combine with the chlorine of epichlorohydrin. It is preferable to use a stoichiometric excess of alkali (about 2% to 30%) so as to insure the complete combination of chlorine. Theoretically, one mol of epichlorohydrin will react with one hydroxyl group of polyhydric phenol to form the polyglycidyl polyether of the phenol. For example, if one mol of a dihydric phenol is used, then two mols of epichlorohydrin would be theoretically required to react and form one mol of the diglycidyl diether of the phenol. In practice, however, a higher ratio than two mols of epichlorohydrin per mol of dihydric phenol has been required. The chain length and extent of polymerization can be varied by changing the mol ratio of epichlorohydrin to dihydric phenol within the range of 10:1 to 1.2:1. Thus, by decreasing the mol ratio of epichlorohydrin to dihydric phenol from 10 towards 1.2, polyglycidyl polyethers having longer chain lengths, higher epoxy equivalents and higher softening points can be obtained. The reaction temperature can be preferably controlled at from 25° to 150° C. by regulating the amount of water in the aqueous alkali added or by cooling the walls of the reaction vesel. The heating is continued for several hours to effect the reaction—the time depending on the temperature, proportion of the reactants, and technique of mixing the reactants. The product is then washed free of salt and base and purified by methods well recognized in the art.

Any of the various dihydric phenols may be used in preparing the polyethers including mononuclear phenols such as resorcinol, hydroquinone, methyl resorcinol, etc. or polynuclear phenols like 2,2-bis(4-hydroxyphenyl)-propane(Bis-phenol A), 4,4'-dihydroxybenzophenone, bis(4-hydroxyphenyl)methane, 1,1 - bis(4 - hydroxyphenyl)-ethane, 1,1-bis(4-hydroxyphenyl)isobutane, 2,2-bis(4-hydroxyphenyy)butane, 2,2-bis(4-hydroxy-2-methylphenyl)-propane, 1,5-dihydroxynaphthalene, etc.

Fluorinated dihydric phenols and fluoroaromatic diols are also useful in this invention because not only can they be used in forming the intermediate polyethers, but they can be used in the same manner as an aliphatic diol to from the fluorinated product polyols. This is possible when the fluorinated dihydric phenols and fluoroaromatic diols can be obtained in substantially pure monomer form. Illustrative of preferred fluorinated aromatic diols are 1,3-di(2-hydroxyhexafluoro-2-propyl)benzene, and 1,4-di(2-hydroxyhexafluoro-2-propyl)benzene. Illustrative of preferred fluorinated dihydric phenols are tetrafluororesorcinol and 4,4'-dihydroxyoctafluorobiphenyl (prepared from decafluorobiphenyl according to Air Force Materials Laboratory, Technical Report AFML–TR–65–13, Part III, April 1967).

The diglycidyl ethers used in the present invention will be more fully understood from consideration of the following described typical preparations.

4,4'-diglycidyl ether of octafluorobiphenyl

A solution containing 14.8 gm. (0.045 mole) of 4,4'-dihydroxy octafluorobiphenyl in 41.6 gm. (0.45 mole) of epichlorohydrin and 45 gm. of acetone was placed into a single-necked, round-bottomed flask equipped with a magnetic stirrer and a reflux condenser. Water (100 gm.) was added, and the flask contents were heated to the reflux temperature on a silicone oil bath. An aqueous solution of sodium hydroxide (20% by weight) was added in five equal increments, with a 15-min. reaction time between increments. The aqueous phase was then separated, and a sixth equal increment of sodium hydroxide was added. The total quantity of alkali was 4.0 gm. (0.10 mole). After 15 min. of additional reflux, 100 ml. of water was added, the aqueous phase was separated and discarded, and excess epichlorohydrin was removed at 160° C. and 5-mm. Hg pressure on a rotary evaporator. The residue was a brown oily material weighing 17.8 gm. It was recrystallized twice from ethanol and once from methanol to yield 11.9 gm. (60% of theoretical) of the diglycidyl ether of 4,4'-octafluorobiphenyl. Analytical samples were prepared by recrystallizing the material four additional times from pure methanol. The elemental analysis and physical properties are:

$C_{16}H_{10}F_8O_4$

|  | Theory | Found |
| --- | --- | --- |
| Carbon, percent | 48.88 | 49.15 |
| Hydrogen, percent | 2.28 | 2.50 |
| Fluorine, percent | 34.36 | 34.43 |
| Epoxy equivalent weight | 221 | 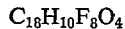242 |
| Melting point, °C | | 75–77 |

[1] Found by pyridine hydrochloride titration.

Major infrared bands: 1480, 1090, 990, 890, and 730 cm.[-1]. The pure material is a white crystalline solid with a waxy appearance.

Diglycidyl ether of tetrafluororesorcinol

Tetrafluororesorcinol, 30.0 gm. (0.165 mole), epichlorohydrin, 213 gm. (2.31 mole), and water, 1.0 ml., were placed into a 500-ml., round-bottomed, single-necked flask fitted with a reflux condenser and a magnetic stirrer. An exothermic reaction began immediately. The flask was immersed in cold water until the temperature returned to ambient. Powdered sodium hydroxide, 16.0 gm. (0.40 mole), was slowly added through the condenser into the stirred reactants over a period of 2 hrs. The flask contents were then heated to 110° C. and stirred for an additional 2 hrs. Excess epichlorohydrin was removed on a rotary evaporator, and a brown semisolid residue remained. This residue was extracted three times with 100-ml. portions of hot benzene, and a solid polymeric residue with a chocolate-brown color remained in the flask. The benzene extracts were combined, and the solvent was evaporated on a warm water bath. More residual solvent was then stripped on a rotary evaporator. The brown liquid residue was then passed through a molecular still at 100° C. and 250μ Hg pressure to remove the last traces of epichlorohydrin. The residue was then passed through the molecular still again at 180° C. and 200μ Hg pressure to yield a clear distillate weighing 17.0 gm. (34.8% of theory for the diglycidyl ether of tetrafluororesorcinol). A 5.0 gm. portion of this material was then redistilled slowly at 175° C. and 1-mm. Hg pressure to obtain an analytical sample. The analytical results indicate that the material is principally the dimer having the following properties:

$C_{21}H_{16}F_8O_7$

|  | Theory | Found |
| --- | --- | --- |
| Carbon, percent | 47.37 | 48.05 |
| Hydrogen, percent | 3.03 | 5.02 |
| Fluorine, percent | 28.55 | 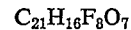22.69 |
| Epoxy equivalent weight | 266 | 250 |

Major infrared bands: 1500, 1030, and 900 cm.[1].

Diglycidyl ether of 1,3-di(2-hydroxyhexafluoro-2-propyl)-benzene

The ingredients were 1-3-dihexafluoropropyl benzene diol 455 gm. (1.11 mole), epichlorohydrin 1027 gm. (1.11 mole), acetone 1027 gm., water 150 gm., NaOH 97.6 gm. (2.44 mole) in 390 gm. $H_2O$. The diol, acetone, epichlorohydrin and water were put into a 3 necked r.b., 5000 ml. flask equipped with a good mechanical stirrer, hot water bath, reflux condenser and addition funnel and heated to reflux. With rapid stirring, the 20% NaOH solution was added as ⅙ portions every 15 minutes. After the fifth addition and reflux, the aqueous layer was allowed to separate and was drawn off. Reflux resumed, 6th addition made and the mixture was refluxed for 15 minutes. The aqueous layer was again removed. The acetone largely evaporated off with some epichlorohydrin. The solution was vacuum filtered to remove the salt. The epichlorohydrin was further stripped off at 80° C. for 3 hrs. at atmospheric pressure. 600 gm. (1.15 mole) of crude product was obtained. 250 ml. methanol was added and the product solution was then heated and dissolved therein. Subsequently it was cooled to 0° C., and the precipitate filtered out. The dried precipitate yielded 241 gm. of white waxy crystals. Epoxy equivalent weight=269 (theory 261).

Fluorinated diols which can be advantageously used with the aforementioned diglycidyl ethers to form the product polyols are of the aliphatic type having the formula $HO(R)_nOH$ where $n=3$ to 14 and R is a divalent fluoroaliphatic carbon chain. The diols containing fluoroaliphatic groups with from 3 to 14 carbon atoms are of particular interest since they have low energy, oleophobic, and hydrophobic characteristics, but are increasingly expensive and hence not preferred. It should be noted that extension of this invention to more highly fluorinated systems depends primarily upon the availability of suitable difunctional, heavily-fluorinated compounds from which the glycidyl ethers can be prepared. A preferred fluoroaliphatic diol which is available commercially is 2,2,3,3,4,4-hexafluoro-1,5-pentane diol.

In forming the curable mixtures, small amounts of catalysts are desirable for promoting the cure reaction. Since catalyst concentrations and curing temperatures are believed to affect the curing rate, the higher concentrations and temperatures promote faster cures than the lower ones. Consequently, catalyst concentrations can be varied over a broad range and can be selected on the basis of the rate of cure desired and the curing temperature to be used. It has been found, however, that catalyst concentrations from about 0.1 to 20 weight percent based on the weight of polyether composition are advantageous. Although higher concentrations may be used there appears to be no particular advantage to be obtained. Preferred catalyst concentrations usually range from about 0.2 to about 10 weight percent based on the weight of polyglycidyl polyether composition in the curable mixture. The tertiary amine catalysts have been used with success in this invention with the aliphatic tertiary amines being preferred. Illustrative of such catalysts are dimethyl benzyl amine and triethylene diamine.

The use of an appropriate solvent also helps to promote the cure reaction in addition to acting as a diluent. Polar solvents are particularly helpful in improving the reaction rate, however, both polar and non-polar solvents aid in preventing the reaction mixture from becoming too viscous for efficient handling. The amount may vary widely depending on the reactants and curing conditions. Frequently a range of from one-half to twice the volume of reactants is used. Secondary and tertiary alcohols are suitable, with the tertiary alcohols being more desirable because they are less likely to become a reactant and interfere in the polyol polymerization reaction. Exemplary of preferred alcohols are tertiary—butyl, amyl, or pentyl—alcohols.

The invention is illustrated by the following examples. The reactants, their proportions and ratios and other specific ingredients in combination with times and temperatures are presented as being typical and various modifications can be made in view of the foregoing disclosure without departing from the spirit or scope of the disclosure or of the claims.

EXAMPLE 1

A 1:1 stoichiometric amount of the diglycidyl ether of octafluorobiphenyl and 4,4′-dihydroxy octafluorobiphenyl were melted and dissolved into one another at 100° C. After two hours, the temperature was raised to 120° C. for 5 hours, and the reaction was completed at 165° C. for 24 hours. The polyol product was a light amber solid which formed clear brittle films from acetone solution. The epoxy equivalent weight was 4,000.

EXAMPLE 2

A 1:1 stoichiometric amount of the diglycidyl ether of octafluorobiphenyl and 2,2,3,3,4,4-hexafluoro-1,5 pentane diol were reacted in a closed vessel at 165° C. for 24 hours. The product was an amber colored elastomeric polyol with an epoxy equivalent weight of 5,100.

EXAMPLES 3-8 (AS SHOWN IN THE TABLE)

1:1 molar ratios of the purified components were dissolved in enough tertiary alcohol to provide a flowable polyol product at the end of the reaction. The amount of alcohol varies widely but conveniently a volume equal to the volume of the reactants is used with good results. Approximately, five weight percent of tertiary amine catalyst based on the weight of diglycidyl ether was also added and the reaction carried out at 70–90° C. for 130–170 hours.

TABLE

| Ex. | Diglycidyl ether of— | Fluorinated dihydroxy hydrocarbon | Solvent | Catalyst | Epoxy equiv. weight |
|---|---|---|---|---|---|
| 3 | Bisphenol A | 2,2,3,3,4,4 hexafluoropentane-1,5-diol | T-amyl alcohol | Dimethyl benzyl amine | 4,100 |
| 4 | 1,3-di(2-hydroxyhexa-fluoro-2-propyl) benzene. | 1,3-di(2-hydroxyhexafluoro-2-propyl) benzene. | do | do | 6,000 |
| 5 | 1,4-di(2-hydroxyhexa-fluoro-2-propyl) benzene. | 1,4-di(2-hydroxyhexafluoro-2-propyl)benzene | do | do | 7,500 |
| 6 | 1,3-di(2-hydroxyhexa-fluoro-2-propyl)benzene. | 1,3-di(2-hydroxyhexafluoro-2-propyl)benzene | T-butyl alcohol | do | 7,300 |
| 7 | Bisphenol A | 1,4-di(2-hydroxyhexafluoro-2-propyl)benzene | T-amyl alcohol | Triethylene diamine | 6,900 |
| 8 | 1,4-di(2-hydroxyhexa-fluoro-2-propyl)benzene. | do | T-butyl alcohol | do | 7,500 |

EXAMPLE 9

The reaction and procedure of Example 2 were repeated with about a 1:2 stoichiometric amount of diglycidyl ether of octafluorobiphenyl to 2,2,3,3,4,4-hexafluoro-1,5-pentane diol. The product was a light amber colored elastomeric polyol with an epoxy equivalent weight of 3,200.

EXAMPLE 10

The reaction and procedure of Example 4 were repeated with about a 1:2 stoichiometric amount of diglycidyl ether of 1,3-di(2-hydroxyhexafluoro-2-propyl)benzene to 1,3-di-(2-hydroxyhexafluoro-2-propyl)benzene. The product had an epoxy equivalent weight of 3800.

EXAMPLE 11

The reaction and procedure of Example 8 was repeated except that 2,2,3,3,4,4-hexafluoro-1,5-pentane diol was used for the dihydroxy compound. A 1.5:1 stoichiometric amount of diglycidyl ether of 1,4-di(2-hydroxyhexafluoro-2-propyl)benzene to 2,2,3,3,4,4-hexafluoro - 1,5 - pentane diol was used. The product had an epoxy equivalent weight of 4100.

The epoxy equivalent weights of the polyols were determined by the pyridine hydrochloride method. Disappearance of the dihydroxy groups were followed by GLC. All of the systems behaved similarly, showing virtual disappearance of the dihydroxy groups in 10–40 hours, and reaching epoxy equivalent weights ranging from 3,200 to 7,500 in from 2 to 200 hours at 60–160° C.

If long chain high molecular weight polyols are desired, it has been discovered that it's important to have the diglycidyl ether and the fluorinated dihydroxy hydrocarbons in as purified a condition as possible. The reason is that any impurities will tend to terminate the chain lengths and result in undesirable syrupy low molecular weight polyols. Similarly, it is important to begin with a 1:1 molar ratio, as any substantial deviation from this will also result in low molecular weight product polyols. Generally, it has been shown that the use of tertiary alcohol solvents will result in the more desirable higher molecular weight polyols.

It has been found, however, that suitable lower molecular weight polyols may be formed using a 2:1 to 1:2 stoichiometric ratio of polyglycidyl ether to fluorinated dihydroxy hydrocarbon. These polyols are desirable for applications requiring low viscosity precure epoxides, such as where thin coatings or light coated laminates are needed.

Different techniques can be used to make fluoro-epoxy coatings in which at least the final step is polymerization in-situ. These may be described as (a) solventless straight cure, (b) solventless pre-body before application, and (c) pre-cure with solvent application and post-cure. The choice of the best technique depends upon the volatilities and reactivities of components. Examples of these three techniques follow.

The diglycidyl ether of Bisphenol-A containing a stoichiometric amount of hexafluoropentane diol can be used conveniently in the solventless straight cure because the system is liquid at modest temperature (40° C.) and becomes viscous rapidly enough at 100° C. to prevent volatile loss of much diol. The use of 0.2 weight percent catalyst is desirable. The liquid is merely spread upon a surface and the temperature is gradually increased until solidification of the coating takes place. If an insoluble film is desired, a final cure temperature of 160° C. for 10 hours may be used, but good soluble coatings can be obtained at 100° C. in 5 hours. This system contains 21% fluorine by weight.

Fluorinated epoxies are less reactive than the normal diglycidyl ethers, and the melting point of diglycidyl ethers of octafluorobiphenyl is 76° C. The reaction with equivalent amounts of the fluorinated diol to form coatings from ethers of octafluorobiphenyl is more conveniently carried out by the solventless prebody technique. The components are melted together, stirred until homogenous and allowed to react above the melt temperature until a liquid is obtained that does not readily solidify upon cooling. The fluorinated biphenyl resin requires about 4 hours at 90° C. This syrup can then be used to form the coating and cured for about 24 hours until solid polymer is obtained at 100°–165° C. In this case the fluorine content is about 40% by weight.

The third coating method, precure with solvent application and post-cure, can be used most conveniently to produce coatings from the diglycidyl ether of 4,4'-dihydroxyoctafluorobiphenyl and 4,4'-dihydroxyoctafluorobiphenyl. In this case, the fluorinated biphenol may be considered the curing agent. Its melting point is greater than 200° C., and it is necessary to pre-react a stoichiometric composition of the two components in a closed vessel with a small amount of catalyst to prevent losses due to sublimation. A cure schedule of 2 hours at 100° C. followed by 10 hours at 120° C. produces a viscous liquid which solidifies during cooling to room temperature. This material is soluble in polar solvents from which it may be deposited as a film. After the film is formed and the solvent is evaporated, the reactions can be completed at 160° C. during 24 hours.

What is claimed and desired to be secured by Letters Patent of the United States is:

1. A curable mixture comprising a polyglycidyl polyether of a polyhydric phenol and a fluorinated alkaryl diol consisting of

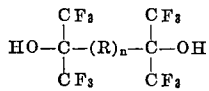

where $n$ is 1, 2 or 3 and R is a phenylene radical containing from 0 to 4 fluorine atoms, in the proportions of about one to two molar parts of polyglycidyl polyether to about one to two molar parts of fluorinated alkaryl diol.

2. The mixture of claim 1 including a tertiary amine catalyst in the amount of 0.1 to 20 weight percent based on the weight of polyglycidyl polyether.

3. The mixture of claim 2 including a polar solvent as a diluent.

4. The mixture of claim 3 whereby the polar solvent is a tertiary alcohol.

5. The mixture of claim 1 whereby the polyether is a diglycidyl ether of a fluorinated dihydric phenol.

6. The mixture of claim 2 whereby the polyether is a diglycidyl ether of a fluorinated dihydric phenol.

7. The mixture of claim 6 whereby the polyether is a diglycidyl ether of 1,3-di(2-hydroxyhexafluoro-2-propyl)-benzene.

8. The mixture of claim 6 whereby the polyether is a diglycidyl ether of 1,4-di(2-hydroxyhexafluoro-2-propyl)-benzene.

9. The mixture of claim 5 whereby the polyether is a diglycidyl ether of 4,4'-dihydroxyoctafluorobiphenyl.

10. The mixture of claim 2 whereby the polyether is a diglycidyl ether of 2,2-bis(4-hydroxyphenyl)propane.

11. The mixture of claim 6 whereby the fluorinated alkaryl diol is 1,3-di(2-hydroxyhexafluoro-2-propyl)benzene.

12. The mixture of claim 6 whereby the fluorinated alkaryl diol is 1,4-di(2-hydroxyhexafluoro-2-propyl)benzene.

13. A fluorinated polyol produced by reacting about one to two molar amounts of a polyglycidyl polyether of a polyhydric phenol and about one to two molar amounts of fluorinated alkaryl diol consisting of

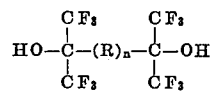

where $n$ is 1, 2 or 3 and R is a phenylene radical containing from 0 to 4 fluorine atoms for 2 to 200 hours at 60–160° C.

14. The fluorinated polyol of claim 13 including the use of a tertiary amine catalyst in amounts of 0.1 to 20 weight percent based on the weight of polyglycidyl polyether.

15. The fluorinated polyol of claim 14 including the use of a tertiary alcohol solvent as a diluent.

References Cited
UNITED STATES PATENTS

| | | | |
|---|---|---|---|
| 3,549,591 | 12/1970 | Griffith | 260—47 EC |
| 2,928,810 | 3/1960 | Belanger | 260—47 EC |
| 2,731,444 | 1/1956 | Greenlee | 260—47 EC |
| 3,294,742 | 12/1966 | Bremmer | 260—47 EC |
| 3,417,069 | 12/1968 | David | 260—92.3 |

LEWIS T. JACOBS, Primary Examiner

U.S. Cl. X.R.

260—47 EC